US012210912B2

(12) United States Patent
Skuliber et al.

(10) Patent No.: US 12,210,912 B2
(45) Date of Patent: Jan. 28, 2025

(54) METHOD AND SYSTEM FOR UNIFORM, CONSISTENT, STATELESS AND DETERMINISTIC CONSISTENT HASHING FOR FIXED SIZE PARTITIONS

(71) Applicant: Synchronoss Technologies, Inc., Bridgewater, NJ (US)

(72) Inventors: Ivan Skuliber, Dublin (IE); Dennis P. Mathew, Allentown, PA (US); Michael A. Bellomo, Nazareth, PA (US)

(73) Assignee: Synchronoss Technologies, Inc, Bridgewater, NJ (US)

( * ) Notice: Subject to any disclaimer, the term of this patent is extended or adjusted under 35 U.S.C. 154(b) by 0 days.

(21) Appl. No.: 16/567,473

(22) Filed: Sep. 11, 2019

(65) Prior Publication Data

US 2021/0073043 A1    Mar. 11, 2021

(51) Int. Cl.
  *G06F 7/00*    (2006.01)
  *G06F 3/06*    (2006.01)
  (Continued)

(52) U.S. Cl.
  CPC .......... *G06F 9/5061* (2013.01); *G06F 3/0604* (2013.01); *G06F 3/0644* (2013.01);
  (Continued)

(58) Field of Classification Search
  CPC ...... G06F 9/5061; G06F 3/0644; G06F 3/067; G06F 3/0662; G06F 3/0604; G06F 9/5027; G06F 2209/504
  (Continued)

(56) References Cited

U.S. PATENT DOCUMENTS

| 7,809,769 B2 * | 10/2010 | Butcher | G06F 16/2282 |
| | | | 707/809 |
| 8,023,429 B2 * | 9/2011 | Briscoe | H04L 41/0806 |
| | | | 370/252 |

(Continued)

FOREIGN PATENT DOCUMENTS

JP    2016181215 A  *  10/2016

*Primary Examiner* — Thu V Nguyen
*Assistant Examiner* — Golam Mahmud
(74) *Attorney, Agent, or Firm* — Banner & Witcoff, Ltd.

(57) ABSTRACT

A computer implemented method and system for uniform, consistent, stateless, and deterministic consistent hashing for fixed size partitions. The method comprises receiving server information for a plurality of servers in a server pool; ordering the server information for the plurality of servers; calculating a mean number of partitions per server in the server pool; calculating a first maximum allowed number of partitions for a server by applying a floor function to the calculated mean number of partitions per server in the server pool; in the order of the ordered server information, assigning partitions to servers based on a hashing function, using the first maximum allowed number of partitions per server; calculating a second maximum allowed number of partitions for a server by applying a ceiling function to the calculated mean number of partitions per server in the server pool; in the order of the ordered server information, assigning partitions to servers based on a hashing function, using the second maximum allowed number of partitions per server; and assigning unassigned partitions wherein assigning comprises: for each unassigned partition, mapping the partition to a server with the least number of assigned partitions at a time of the mapping.

15 Claims, 8 Drawing Sheets

(51) Int. Cl.
*G06F 9/50* (2006.01)
*G06F 15/173* (2006.01)
*G06F 17/00* (2019.01)

(52) U.S. Cl.
CPC ............ *G06F 3/0662* (2013.01); *G06F 3/067* (2013.01); *G06F 9/5027* (2013.01); *G06F 2209/504* (2013.01)

(58) Field of Classification Search
USPC ........................................................ 709/226
See application file for complete search history.

(56) References Cited

U.S. PATENT DOCUMENTS

| | | | | |
|---|---|---|---|---|
| 8,392,482 | B1* | 3/2013 | McAlister | G06F 16/1727 707/899 |
| 8,538,926 | B2* | 9/2013 | Barton | G06F 3/0644 709/251 |
| 8,775,375 | B2* | 7/2014 | Holt | G06F 16/951 709/219 |
| 8,782,322 | B2* | 7/2014 | Houlihan | G06F 9/4856 718/1 |
| 9,170,851 | B2* | 10/2015 | Hamano | G06F 9/5088 |
| 9,460,185 | B2* | 10/2016 | Swift | G06F 16/278 |
| 9,720,989 | B2* | 8/2017 | Theimer | G06F 16/258 |
| 11,140,220 | B1* | 10/2021 | Coleman | H04L 67/1031 |
| 2006/0218123 | A1* | 9/2006 | Chowdhuri | G06F 16/24532 |
| 2007/0271211 | A1* | 11/2007 | Butcher | G06F 16/278 |
| 2009/0271412 | A1* | 10/2009 | Lacapra | G06F 16/178 |
| 2011/0047350 | A1* | 2/2011 | Geissler | G06F 1/324 712/E9.001 |
| 2011/0197198 | A1* | 8/2011 | Kanso | H04L 67/1001 718/105 |
| 2012/0233117 | A1* | 9/2012 | Holt | H04L 69/04 707/E17.002 |
| 2012/0233418 | A1* | 9/2012 | Barton | G06F 3/0641 711/170 |
| 2012/0233522 | A1* | 9/2012 | Barton | G06F 11/1004 707/E17.014 |
| 2013/0204991 | A1* | 8/2013 | Skjolsvold | G06F 9/5083 709/223 |
| 2016/0132582 | A1* | 5/2016 | Ng | G06F 16/285 707/740 |
| 2017/0161109 | A1* | 6/2017 | Khojastepour | G06F 9/5083 |
| 2019/0310977 | A1* | 10/2019 | Pal | G06F 9/5077 |
| 2020/0019622 | A1* | 1/2020 | Lu | G06F 16/137 |
| 2020/0050386 | A1* | 2/2020 | Natarajan | H04L 63/123 |
| 2020/0287829 | A1* | 9/2020 | Lam | H04L 45/7453 |
| 2020/0322425 | A1* | 10/2020 | Sharma | H04L 67/1095 |

* cited by examiner

PRIOR ART

METHOD AND SYSTEM FOR UNIFORM, CONSISTENT, STATELESS AND DETERMINISTIC CONSISTENT HASHING FOR FIXED SIZE PARTITIONS

BACKGROUND OF THE INVENTION

Field of the Invention

Embodiments of the present invention generally relate to partitioning, and more specifically to uniform, consistent, stateless, and deterministic consistent hashing for fixed size partitions.

Description of the Related Art

Consistent hashing is used in distributed systems and content delivery networks as a method for distributing or routing requests among a changing pool of servers, where each server has an associated cache, thereby speeding up request processing when information relevant for request processing is present in the associated cache. Each server processes one or more partitions (shards or subsets) from the range of possible values output by consistent hashing. Consistent hashing assures that, when servers are arbitrarily added to or removed from the server pool, there is minimal moving or remapping of partitions among the remaining servers in the server pool.

While consistent hashing assures minimal moving or remapping of partitions across servers in the server pool, consistent hashing results in an unbalanced distribution of load across servers in the server pool. Ideally, consistent hashing would be uniform, consistent, deterministic, and stateless. However, the randomness of the output of hashing functions leads to a significant imbalance in the assignment of partitions per server and as a result an imbalance in the distribution of requests per server.

Therefore, there is a need for uniform, consistent, stateless, and deterministic hashing for fixed size partitions processed on an auto-scalable pool of discoverable servers.

SUMMARY OF THE INVENTION

A system and/or method is provided for uniform, consistent, stateless, and deterministic hashing for fixed size partitions processed on an auto-scalable pool of discoverable servers substantially as shown in and/or described in connection with at least one of the figures.

These and other features and advantages of the present disclosure may be appreciated from a review of the following detailed description of the present disclosure, along with the accompanying figures in which like reference numerals refer to like parts throughout.

While the method and system is described herein by way of example for several embodiments and illustrative drawings, those skilled in the art will recognize that the method and system for uniform, consistent, stateless, and deterministic consistent hashing for fixed size partitions is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and system for uniform, consistent, stateless, and deterministic consistent hashing for fixed size partitions defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Techniques are disclosed for a system and method for uniform, consistent, stateless, and deterministic consistent hashing for fixed size partitions, according to embodiments of the invention. The method uses a consistent hashing ring with fixed size partitions. Each fixed size partition is comprised of a subset of subsequent hashing function outputs. In a first phase of the invention, partitions are assigned using a maximum number of partitions that are allowed to be assigned to a given server as determined by applying a floor function to a mean of the number of partitions per server. Next, assignment of partitions is performed again with the maximum number of partitions allowed per server determined by applying a ceiling function to the mean of the number of partitions per server. Lastly, any partitions still not assigned to a server are assigned based on which server has the least number of partitions at the time of assignment. Advantageously, the disclosed method results in a uniform assignment of partitions to servers.

Various embodiments of a method and system for uniform, consistent, stateless, and deterministic consistent hashing for fixed size partitions are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. One skilled in the art will appreciate that any of the present invention may be implemented on specific or general purpose computers (e.g., cloud servers) that communicate with devices and/or implemented on the devices themselves.

Figure 1:
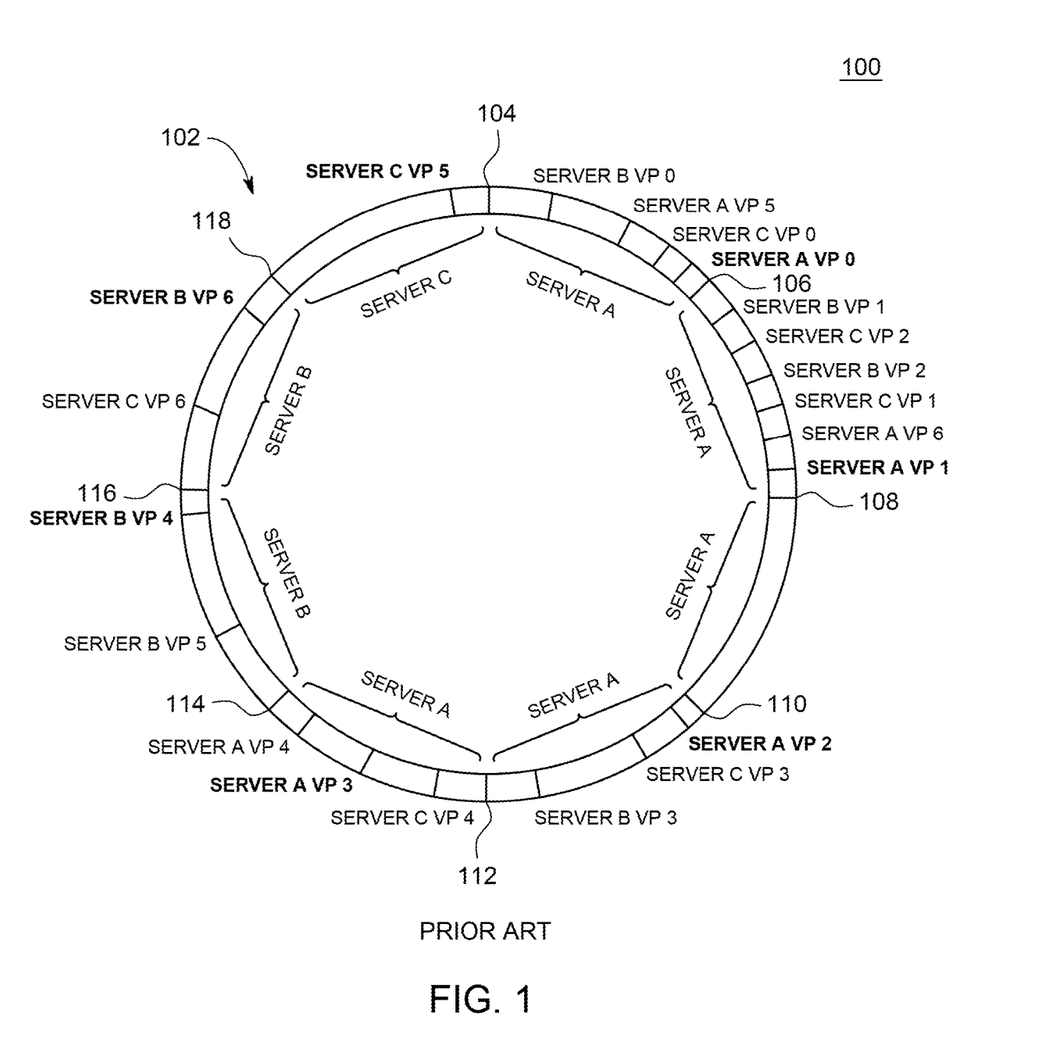
FIG. 1 depicts a conceptual result of assigned partitions using current consistent hashing schemes, according to prior art solutions.

FIG. 1 depicts a conceptual result 100 of assigned partitions using current consistent hashing schemes, according to prior art solutions. Consistent hashing ring 102 is divided into eight fixed-size partitions. Boundaries for each partition are located around the consistent hashing ring 102. Partition 1 is the arc from boundary 104 to boundary 106. Partition 2 is the arc from boundary 106 to boundary 108. Partition 3 is the arc from boundary 108 to boundary 110. Partition 4 is the arc from boundary 110 to boundary 112. Partition 5 is the arc from boundary 112 to boundary 114. Partition 6 is the arc from boundary 114 to boundary 116. Partition 7 is the arc from boundary 116 to boundary 118. Partition 8 is the arc from boundary 118 to boundary 104.

For exemplary purposes, assume there are three available servers, namely "Server A", "Server B", and "Server C" that need to be mapped to the eight partitions. In order to map the servers to the partitions, six virtual points are calculated for each server. Although the present example uses six virtual points, the number of virtual points is configurable and any number of points may be used. The virtual points indexes may be referred to for example, as "VP 0", "VP 1", "VP 2", "VP 3", "VP 4", and "VP 5", making the server name and the virtual point index appended to be "Server A VP 0", "Server A VP 1", "Server A VP 2", and so on and similarly for "Server B" and "Server C". The server name, with its suffix appended, is hashed. The output of the hashing represents a point on the consistent hashing ring 102. Due to the pseudo-randomness of the output of hashing functions, it is possible that for the first four virtual point suffixes (denoted as "VP 0", "VP 1", "VP 2", and "VP 3"), the corresponding virtual points for all available servers, are mapped to the same partitions. For example, virtual points "Server A VP 0", "Server B VP 0", and "Server C VP 0" are all located in Partition 1 between boundary 104 and 108 of the consistent hashing ring 102. Due to the natural ordering of server names and virtual point suffixes, "Server A VP 0" is the first virtual point to be computed. When the computed location lands between boundary 104 and boundary 108, partition 1 is assigned to "Server A". The latter computed virtual points, namely "Server B VP 0" and "Server C VP 0" are ignored because they land in a partition already assigned to "Server A". In other words, "Server B VP 0" and "Server C VP 0" are ignored due to a collision with the first computed virtual point "Server A VP 0".

In continuing mapping the six virtual points for each server, three more partitions are assigned to "Server A" because its virtual points were computed before virtual points of "Server B" and "Server C". Further, due to the pseudo-randomness of hashing functions the virtual points of "Server A" were located in unassigned partitions, specifically Partition 2, Partition 4, and Partition 5. In the present example, "Server B" is assigned two partitions and "Server C" is assigned one partition. As such, the current scheme for consistent hashing results in poor uniformity. In addition, there is also a gap partition. Partition 3 is a gap partition because it is not assigned to a server because Partition 3 has no virtual point located within the partition. Current consistent hashing schemes map unassigned partitions to servers by finding the first partition assigned to a server by moving clockwise along the ring from an unassigned partition. In the present example, the gap partition, Partition 3, is assigned to "Server A", resulting in five of the eight partitions being assigned to "Server A", two of the eight partitions assigned to "Server B", and one of the eight partitions assigned to "Server C". Such imbalanced partition assignments are a common result of current consistent hashing schemes.

Figure 2:
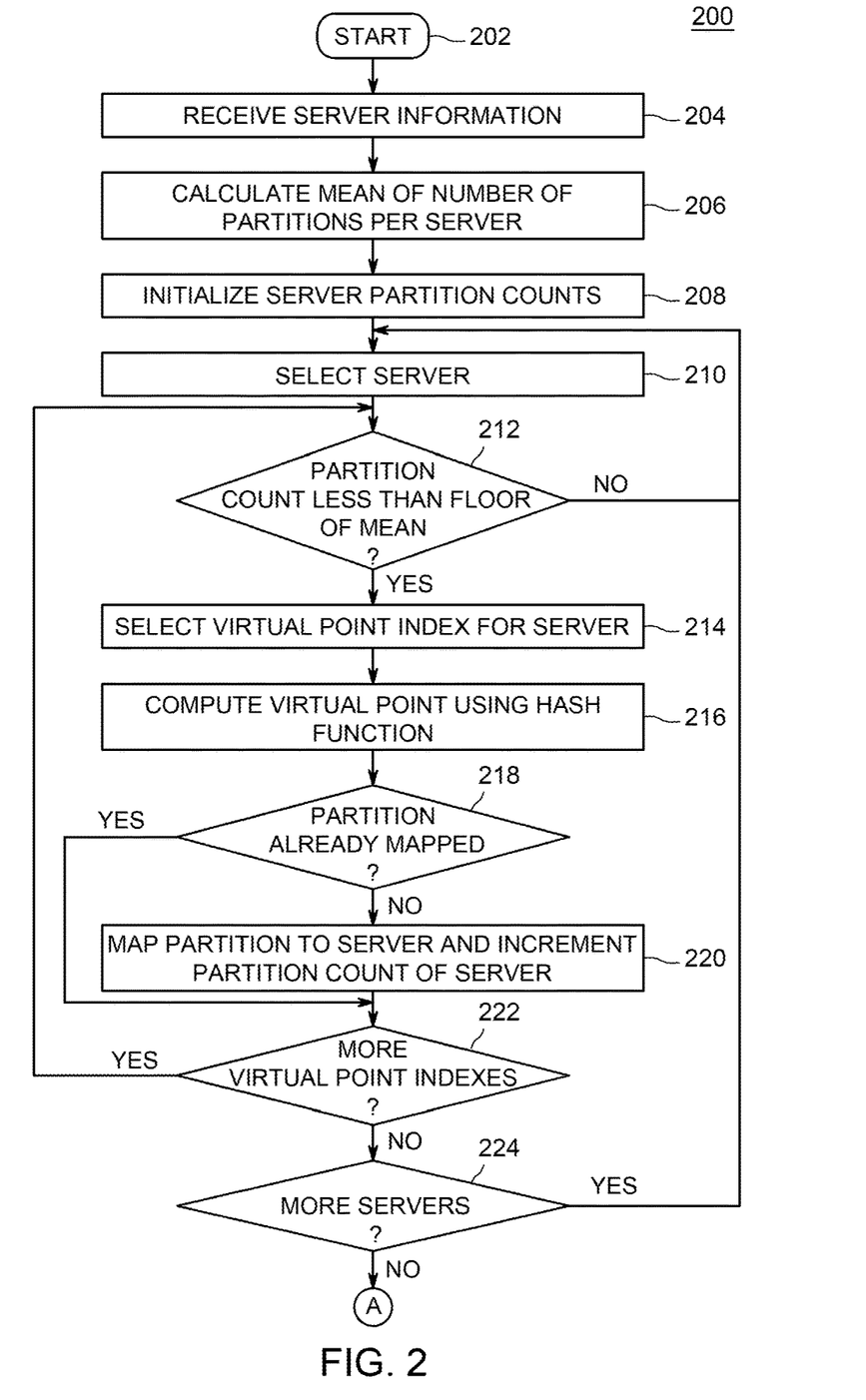
FIG. 2 depicts a flow diagram of a method for uniform, consistent, stateless, and deterministic hashing for fixed size partitions, according to one or more embodiments of the invention.

FIG. 2 depicts a flow diagram of a method 200 for uniform, consistent, stateless, and deterministic hashing for fixed size partitions, according to one or more embodiments of the invention. The method 200 is the first of three phases of the invention. The method starts at step 202 and proceeds to step 204.

At step 204, information is received about servers in a server pool. Information about the server is received in a data structure. Server information may be, for example, a server name or other server identifier. The servers must be ordered or sorted. Ordered data is needed because only the first calculated virtual point (and corresponding server) is assigned to an available partition. If the input containing information on the servers in the server pool differs between invocations of the method, when there is no actual change in servers in the server pool, the mapping between partitions and servers changes, resulting in inconsistency. As such, if there is no guarantee that the input containing information on the servers in the server pool is ordered, then the input is sorted. For example, the sorted server information may be "Server A", "Server B", "Server C".

At step 206, the arithmetic mean of partitions per server is calculated. At step 208, the server partition counts are initialized. In the first phase of the method, the method allows assigning up to a fixed number of partitions to a server. The number of partitions per server is the floor of the arithmetic mean of partitions per server. For example, if there are eight partitions and three servers, the mean number of partitions per server is calculated to be (8/3)=2.66. The floor (2.66)=2. In the present example, the maximum number of partitions that may be assigned to a server is two. As such, a count of the number of partitions assigned to each server is initialized to zero. The counts may be stored as key:value pairs or using any means to track the current number of partitions assigned to each server.

At step 210, a server is selected. As described above, the server information has been ordered. The method starts with the first server in the ordered data structure, in the present example, "Server A". If "Server A" was already processed, the next server would be selected, for example, "Server B".

At step 212, it is determined whether the selected server has a number of partitions less than the floor of the mean of partitions per server. If it is determined that the selected server does not have a number of partitions less than floor of the mean of partitions per server, in other words, it is determined the selected server may not be assigned any additional partitions, the method proceeds to step 210 to select the next server in the order data structure. However, if at step 212, it is determined that a number of partitions assigned to the server is less than floor of the mean of partitions per server, then the method proceeds to step 214.

At step 214, the virtual point index for the server is selected. The number of virtual points per server may be configured. In the present example, each server has six virtual points. For example, the six virtual points indexes may be "VP 0", "VP 1", "VP 2", "VP3", "VP4", "and VP 5". The server information combined with the virtual point indexes may be "Server A VP 0", "Server A VP 1", "Server A VP 2", "Server A VP 3", "Server A VP 4", "Server A VP 5", "Server B VP 0", "Server B VP 1", . . . , "Server B VP 5", "Server C VP 0", "Server C VP 1", . . . , "Server C VP 5". In the first pass through the method, the first virtual point index is used and subsequently each next virtual point index is used. In the present example, "VP 0" for "Server A" is used first.

At step 216, a virtual point is computed and a location on the hashing ring is determined. In some embodiments, as in the present example, both the virtual point index and the server information are represented as strings, and the virtual point index is suffixed to the server information. The server information combined with a virtual point index is inputted into the hashing function and the resulting hashing function output value is the virtual point. Any type of hashing function may be used. For example, a lookup hashing function of the Murmur hashing functions family, or xxHash, and the like may be used. Cryptographic hashing functions such as SHA3 of 128-bit, 256-bit, or 512-bit may be used, or simple general hashing functions may be used. In any case, the virtual point resulting from the hashing function represents a location on the hashing ring.

At step 218, it is determined whether the partition associated with the location on the hashing ring has already been mapped to a server. If it is determined that the partition is not mapped to a server, then at step 220, the partition is mapped to the server associated with the virtual point index and at step 220, the number of partition count for said server is incremented by 1 and the method proceeds to step 222. However, if it is determined that the partition has already been mapped to a server, then the method proceeds directly from step 218 to step 222.

At step 222, it is determined whether more virtual point indexes exist for this server. If so, the method proceeds to step 212 and the method 200 iterates until at step 222 it is determined that no more virtual point indexes exist for this server at which time the method 200 proceeds to step 224.

At step 224, it is determined whether any more servers exist that need to have their virtual point indexes processed. If there are more servers, the method 200 proceeds to step 210 and iterated until at step 224, all servers have been processed.

Figure 3:
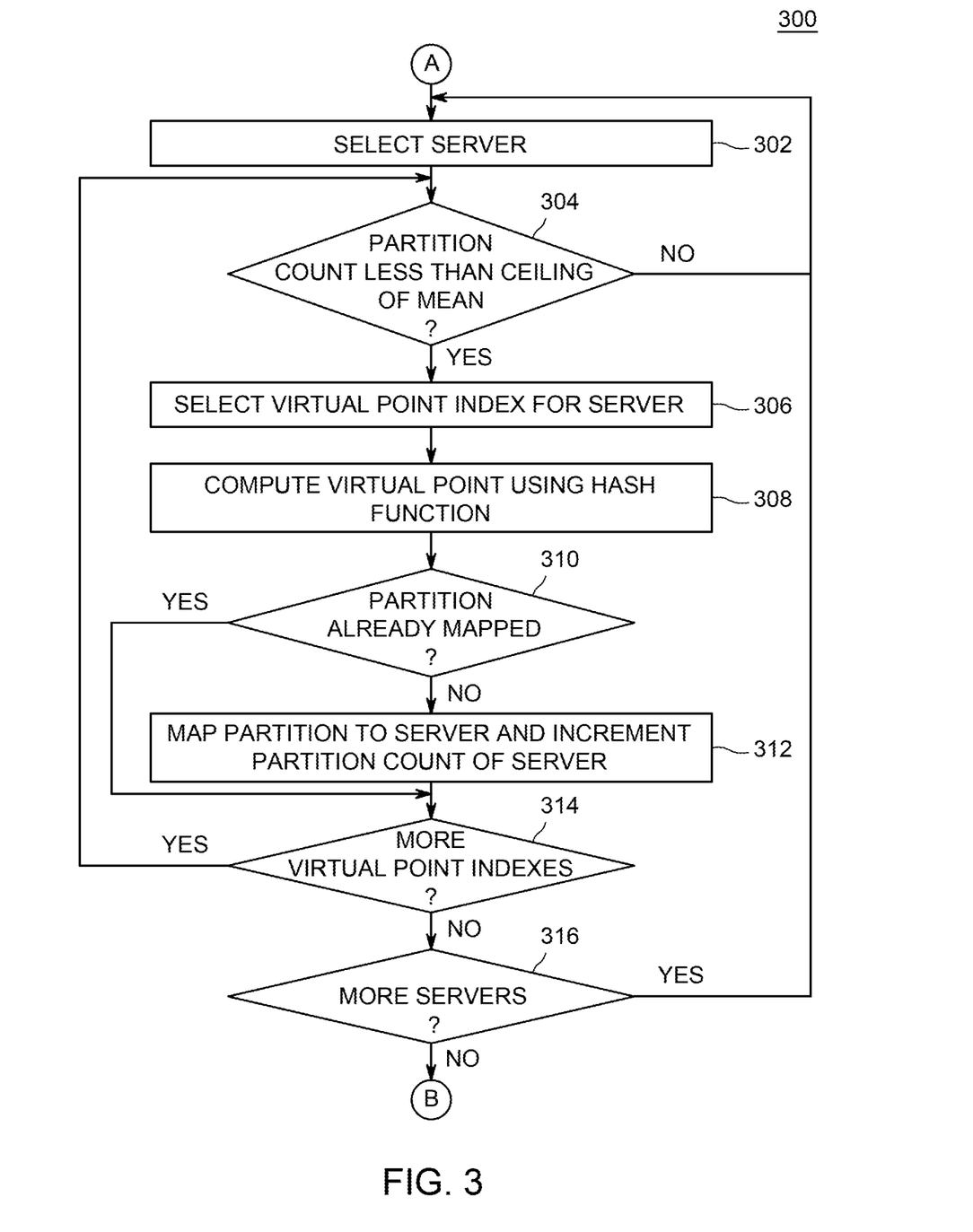
FIG. 3 depicts a flow diagram of a method for uniform, consistent, stateless, and deterministic hashing for fixed size partitions, according to one or more embodiments of the invention.

FIG. 3 depicts a flow diagram of a method 300 for uniform, consistent, stateless, and deterministic hashing for fixed size partitions, according to one or more embodiments of the invention. After the first phase is complete, the partitions have been assigned to servers allowing servers a maximum number of partitions equal to the floor of the mean of partitions per server. In the second phase, the steps are repeated; however, the number of partitions that may be assigned to a server is equal to the ceiling of the mean of partitions per server. In the present example, the mean of partitions per server is (8/3)=2.66. The ceiling (2.66)=3. The method 300 is the second of three phases of the invention. The method starts at step 302.

At step 302, a server is selected. As described above, the server information has been ordered. The method starts with the first server in the ordered data structure. In the present example, "Server A". If "Server A" was already processed, the next server would be selected, for example, "Server B".

At step 304, it is determined whether the selected server has a number of partitions less than the ceiling of the mean of partitions per server. If it is determined that the selected server does not have a number of partitions less than the ceiling of the mean of partitions per server, in other words, it is determined the selected server may not be assigned any additional partitions, the method proceeds to step 302 to select the next server in the order data structure. However, if at step 304, it is determined that a number of partitions assigned to the server is less than ceiling of the mean of partitions per server, then the method proceeds to step 306.

At step 306, the virtual point index for the server is selected. As described above, each server may have six virtual points. For example, the six virtual points indexes may be "VP 0", "VP 1", "VP 2", "VP 3", "VP 4", "and VP 5". The server information combined with the virtual point indexes may be "Server A VP 0", "Server A VP 1", "Server A VP 2", "Server A VP 3", "Server A VP 4", "Server A VP 5", "Server B VP 0", "Server B VP 1", . . . , "Server B VP 5", "Server C VP 0", "Server C VP 1", . . . , "Server C VP 5". In the first pass through the method, the first virtual point index is used and subsequently each next virtual point index is used. In the present example, "VP 0" for "Server A" is used first.

At step 308, a virtual point is computed and a location on the hashing ring is determined. In some embodiments, as in the present example, both the virtual point index and the server information are represented as strings, and the virtual point index is suffixed to the server information. The server information combined with a virtual point index is inputted into the hashing function and the resulting hashing function output value is the virtual point. Again, any type of hashing function may be used.

At step 310, it is determined whether the partition associated with the location on the hashing ring has already been mapped to a server. If it is determined that the partition is not mapped to a server, then at step 312, the partition is mapped to the server associated with the virtual point index and the number of partition count for said virtual server is incremented by 1 and the method proceeds to step 314. However, if it is determined that the partition has already been mapped to a server, then the method proceeds directly from step 310 to step 314.

At step 314, it is determined whether more virtual point indexes exist for this server. If so, the method proceeds to step 304 and the method 300 iterates until at step 314 it is determined that no more virtual point indexes exist for this server at which time the method 300 proceeds to step 316.

At step 316, it is determined whether any more servers exist that need to have their virtual point indexes processed. If there are more servers, the method 300 proceeds to step 302 and iterated until at step 316, it is determined that all servers have been processed.

Figure 4:
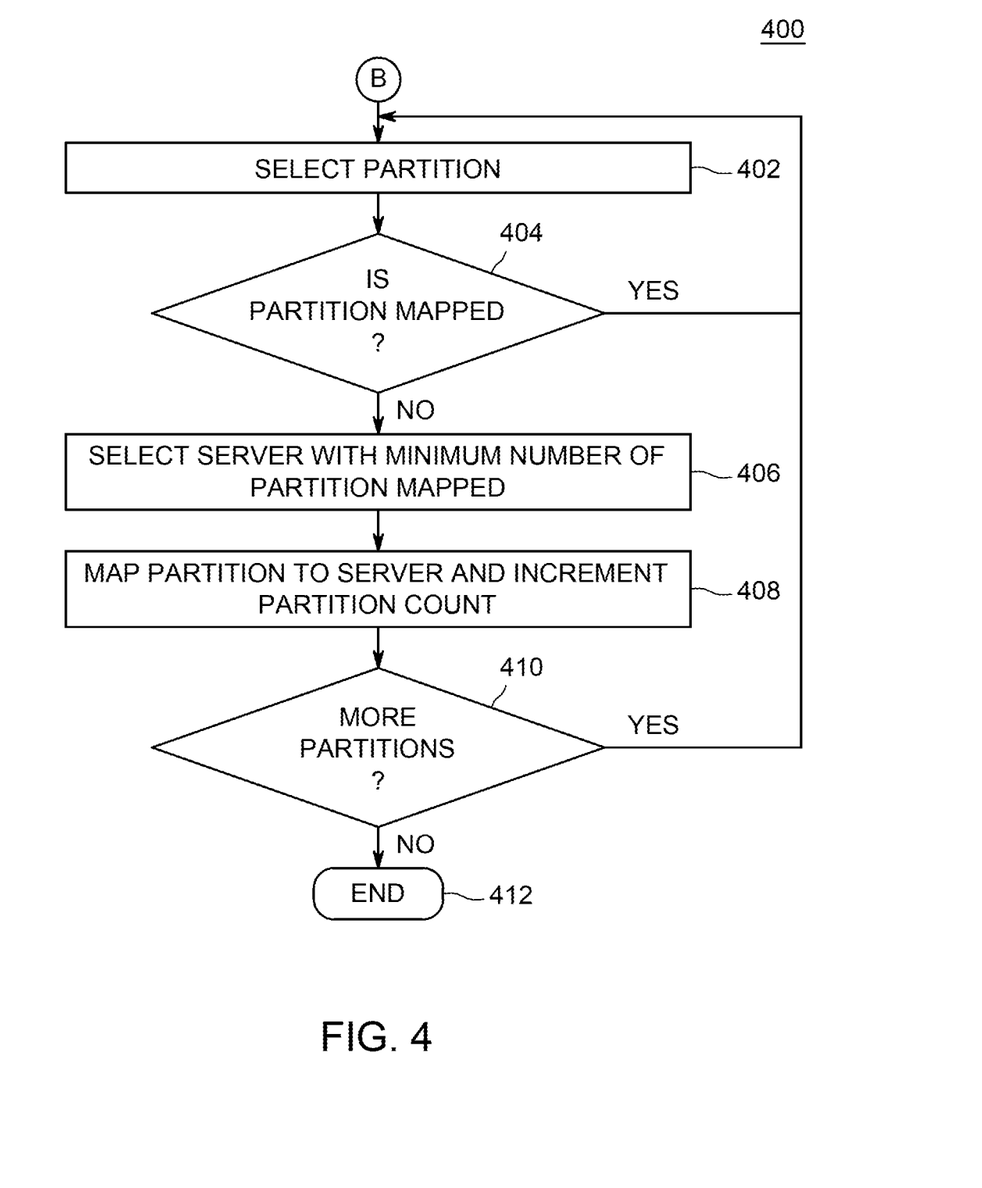
FIG. 4 depicts a flow diagram of a method for uniform, consistent, stateless, and deterministic hashing for fixed size partitions, according to one or more embodiments of the invention.

FIG. 4 depicts a flow diagram of a method 400 for uniform, consistent, stateless, and deterministic hashing for fixed size partitions, according to one or more embodiments of the invention. After the second phase of the method, one or more gap partitions may still exist (i.e., partitions that are still unassigned to servers). The method 400 is the third of three phases of the invention. The method starts at step 402.

At step 402, a partition is selected. The first time through the method, a partition is selected, and with each iteration, a next partition is selected until all partitions have been evaluated.

At step 404, it is determined whether the selected partition is mapped to a server. If it is determined that the selected partition is already mapped to a server, then the method proceeds to step 402. However, if it is determined that the selected partition is not mapped to a server, then at step 406 a server with the minimum number of partitions mapped to that server is selected.

At step 408, the selected partition is mapped to the server and the partition count for the selected server is incremented.

At step 410, it is determined whether there are any additional partitions to be evaluated. If it is determined that there are additional partitions, the method proceeds to step 402 and iterates until at step 410, there are no additional partitions to be evaluated and the method ends at step 412.

Figure 5:
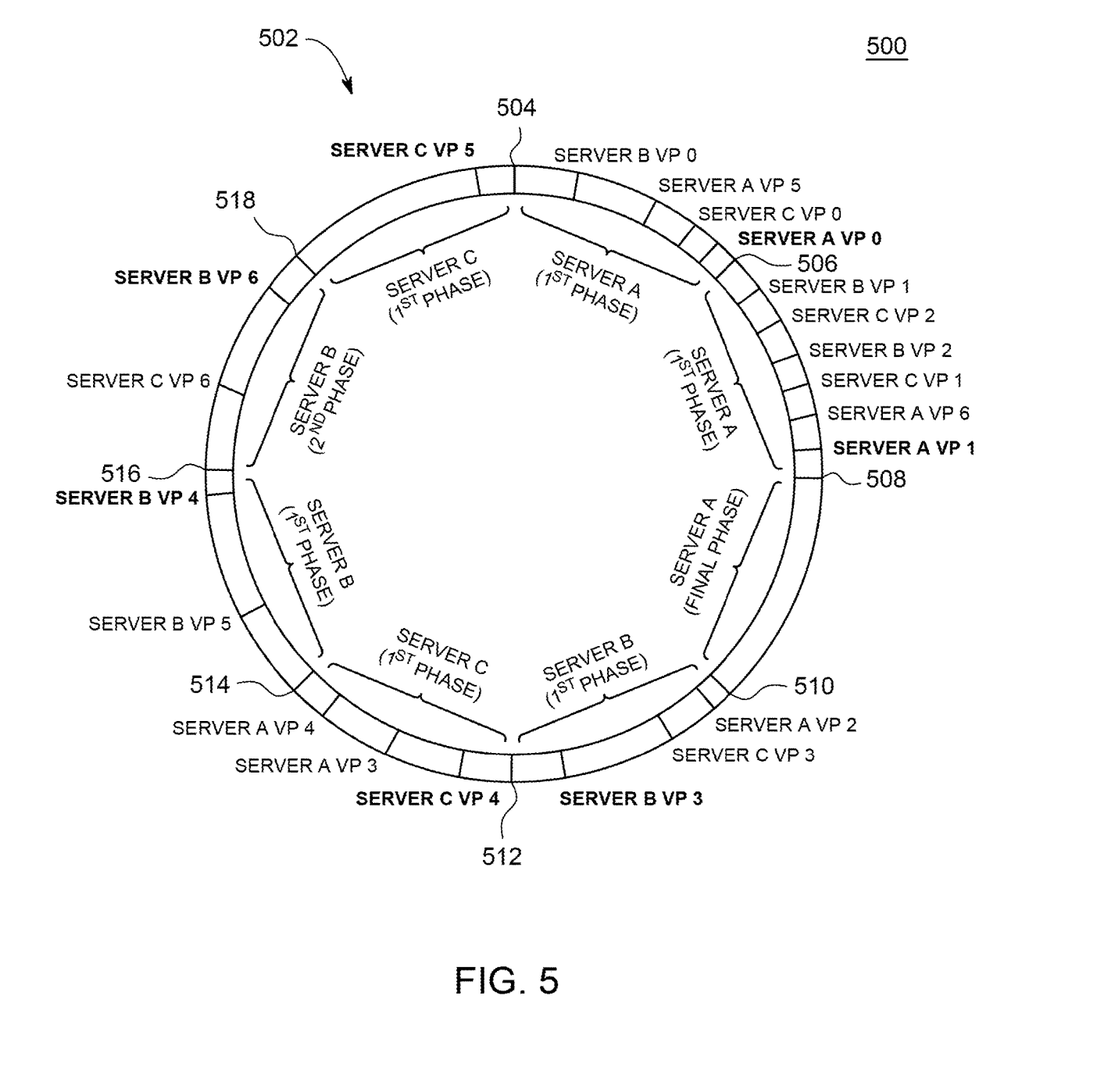
FIG. 5 depicts a conceptual result of assigned partitions using the disclosed method of consistent hashing, according to one or more embodiments of the invention.

FIG. 5 depicts a conceptual result 500 of assigned partitions using the disclosed method of consistent hashing, according to one or more embodiments of the invention. The consistent hashing ring 502 of FIG. 5 is similar to the consistent hashing ring 102 of FIG. 1 in that there are eight same size partitions. Boundaries for each partition are located around the consistent hashing ring 502. Partition 1 is the arc from boundary 504 to boundary 506. Partition 2 is the arc from boundary 506 to boundary 508. Partition 3 is the arc from boundary 508 to boundary 510. Partition 4 is the arc from boundary 510 to boundary 512. Partition 5 is the arc from boundary 512 to boundary 514. Partition 6 is the arc from boundary 514 to boundary 516. Partition 7 is the arc from boundary 516 to boundary 518. Partition 8 is the arc from boundary 518 to boundary 504. Due to the fact that hashing functions are deterministic, the computed virtual points for all of the servers are located in the same locations as on the consistent hashing ring 102 in FIG. 1. However, the disclosed method results in a more uniform distribution of partitions to servers in the server pool.

In the first phase of the invention, method 200 results in "Server A" being assigned Partition 1 and Partition 2. Due to the floor function performed on the mean of the partitions per server, after being assigned two partitions, "Server A" may not be assigned any additional partitions. Progressing though method 200, "Server B" is assigned Partition 4 and Partition 6. "Server C" is assigned Partition 5 and Partition 8. After the first phase of the invention, each Server is assigned two partitions.

The second phase of the invention, method 300 allows servers to be assigned and a number of partitions determined by applying a ceiling function to the mean of the partitions per server. In the present example, each server may be assigned three partitions. During the second phase, "Server B" is assigned partition 7. At this point, "Server A" has been assigned two partitions, "Server B" has been assigned three partitions, and "Server C" has been assigned 2 partitions.

In the final phase of the invention, method 400, the gap partitions, partitions that have still not been assigned to servers are assigned. In the present example, Partition 3 remains unassigned. The unassigned partition is mapped to the server with the fewest assigned partitions. In the present example, "Server A" has two partitions and "Server C" has two partitions. Due to the ordering of the server information, "Server A" is assigned Partition 3. At the end of the disclosed method, "Server A" is assigned three partitions, "Server B" is assigned three partitions, and "Server C" is assigned two partitions resulting in a uniform balance between assigned partitions and servers.

Figure 6:
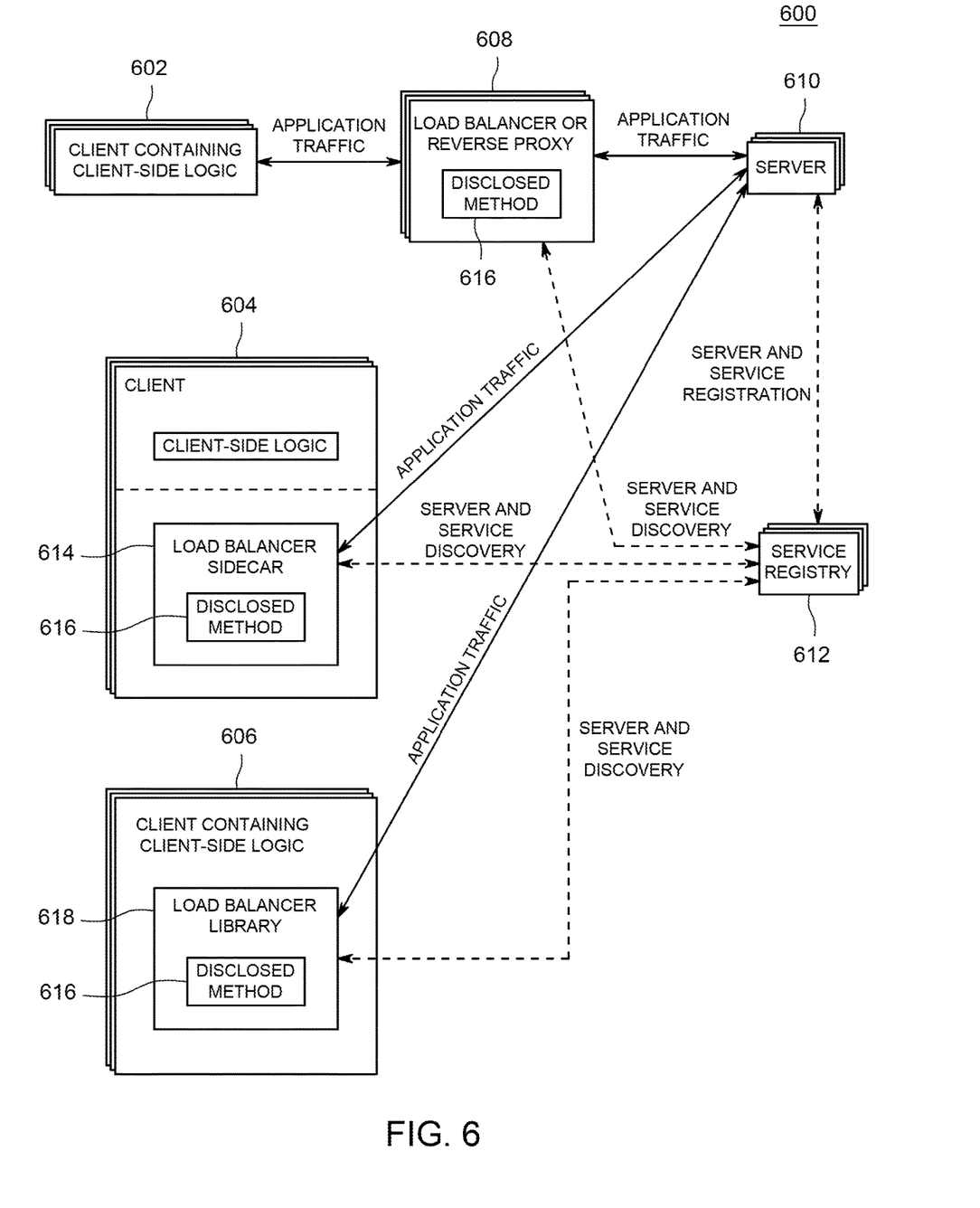
FIG. 6 depicts a block diagram of a first exemplary system for uniform, consistent, stateless, and deterministic hashing for fixed size partitions, according to one or more embodiments of the invention.

FIG. 6 depicts a block diagram of an exemplary system 600 for uniform, consistent, stateless, and deterministic hashing for fixed size partitions, according to one or more embodiments of the invention. The system 600 includes client device 602, client device 604, client device 606, a load balancer or reverse proxy 608, a service registry 612, and a plurality of servers in a server pool 610. The various client devices 602, 604, and 606 are exemplary implementations of the disclosed method. Not all client devices 602, 604, 606 are required for the system.

The service registry 612 is a dedicated service registry that may reside on one or more dedicated nodes. The service registry 612 may be as simple as a Domain Name System (DNS), or as complex as a discovery service, such as Eureka or Universal Description, Discovery, and Integration (UDDI). Service registry 612 includes the information on currently available servers in the server pool 610 that host certain services. Servers hosting a service, register themselves as well as the services they are hosting during their bootstrapping. The registered service information is used as input into the disclosed method. In some embodiments, the information is inputted into the load balancer or reverse proxy 608 either via pull technique where the load balancer or reverse proxy 608 pulls information from the service registry 612 by querying the service registry 612. In some embodiments, the information is inputted into the load balancer or reverse proxy 608 either via push technique where the service registry 612 pushes information into load balancer or reverse proxy 608 via an advertised endpoint for such information.

The disclosed method 616 is a part of the load balancing functionality where it is implemented in any way possible. In some embodiments, the load balancing functionality is explicitly in the code of the load balancer 608 or a programmatic library that the load balancer 608 uses, or implicitly via a plugin that the load balancer 608 uses to extend its core functionality. Load balancing functionality may reside in a dedicated node (e.g., load balancer or reverse proxy 608 that may be a part of a larger cluster of equivalent nodes). Such a dedicated node with load balancing functionality acts as an intermediary between a client device 602 and a service hosted on a server in a server pool 610. In some embodiments, load balancing functionality may be implemented as a sidecar process or container 614 that is collocated on the same node as the client device 604 that is using the service hosted on servers in the server pool 610, through its client-side logic. In some embodiments, load balancing functionality may also be embedded as a programmatic library into the client device 606. The types of clients communicate with required service hosted on a server in the server pool 610 via application traffic.

Figure 7:
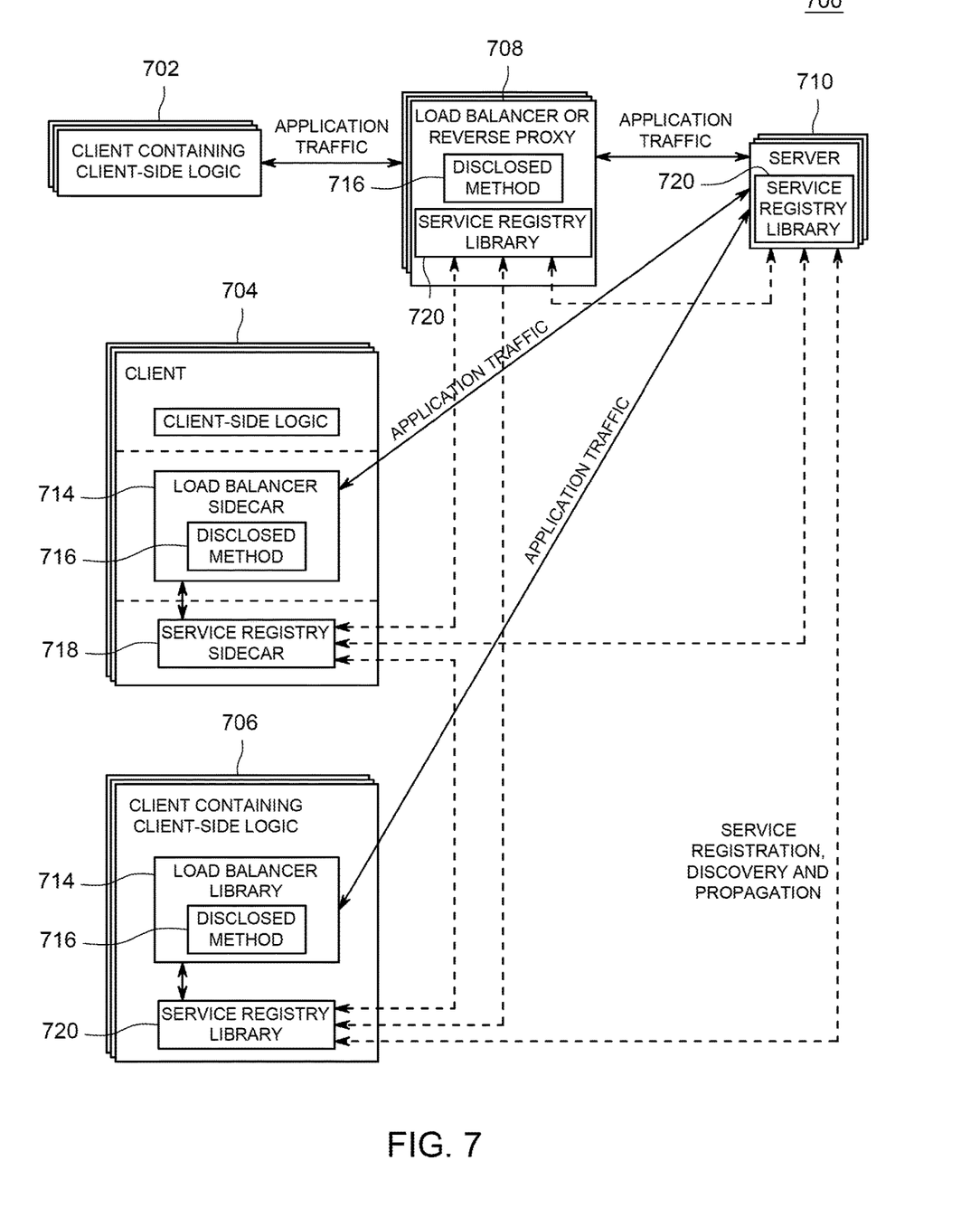
FIG. 7 depicts a flow diagram of a second exemplary system for uniform, consistent, stateless, and deterministic hashing for fixed size partitions, according to one or more embodiments of the invention.

FIG. 7 depicts a flow diagram of an exemplary system 700 for uniform, consistent, stateless, and deterministic hashing for fixed size partitions, according to one or more embodiments of the invention. The system 700 uses the disclosed method 716 with the service registry implemented as a service registry sidecar 718 or embedding service registry library 720 in the nodes that comprise the system. All types of client devices and communication are supported. In the present exemplary system, the service registry 718, 720 is distributed across difference nodes in the system, rather than located on a dedicated or cluster of dedicated nodes as described with respect to FIG. 6 above. Distributed service registry 718, 720 communicates internally across various implementations of distributed service registry through a broadcast or multicast protocol, for example Gossip protocol. Such broadcast or multicast protocol contains various messages that enable server and service registration, discovery, and propagation of server and service information from one node of the distributed service registry to another node of the distributed service registry. With regard to client 704 having a load balancer sidecar 714 or client device 706, having embedded load balancing functionality of the disclosed method 716, communication between the load balancing functionality of the disclosed method 716 and service registry functionality 720 is performed via loopback interface or inter-process.

Figure 8:
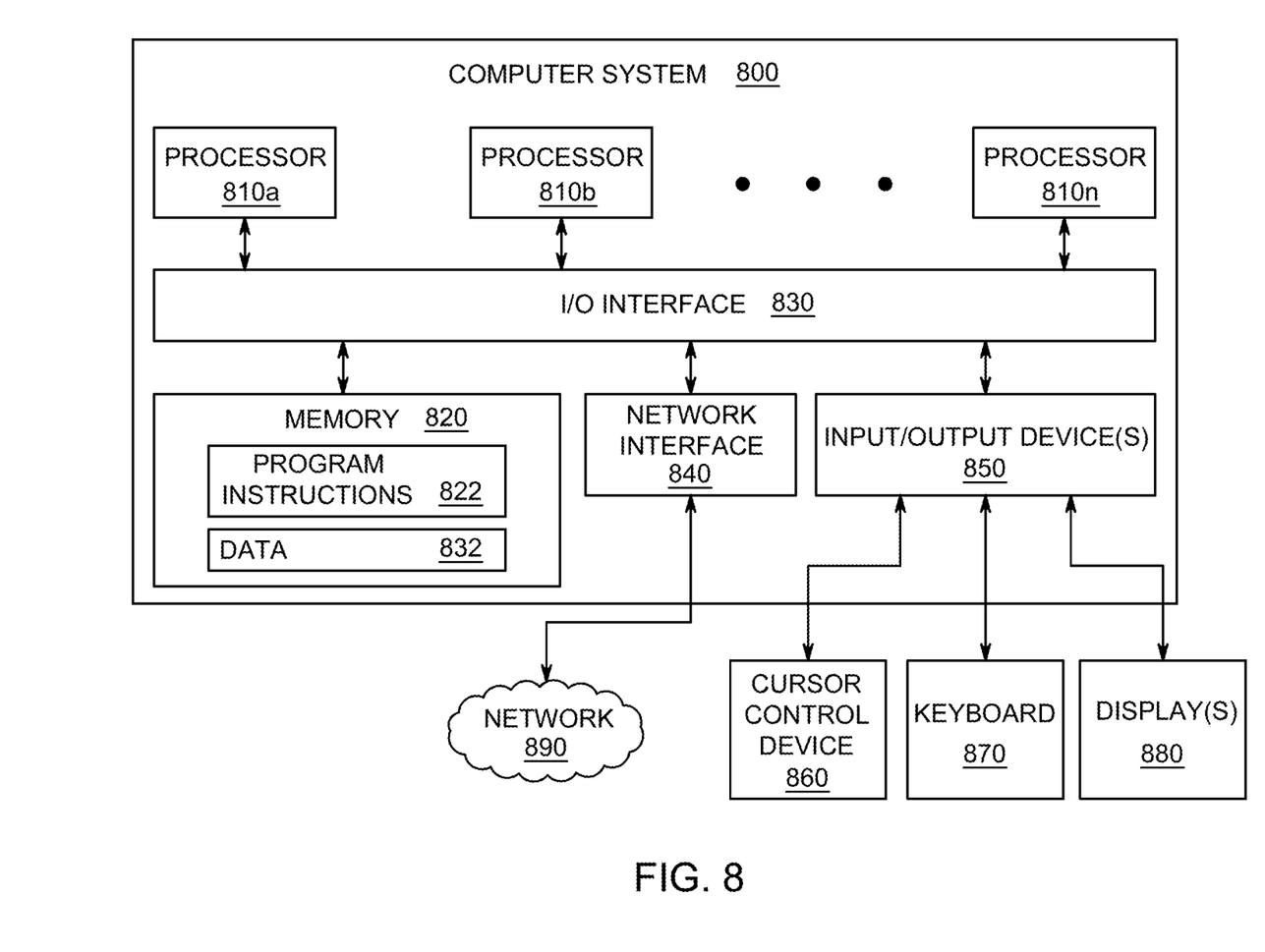
FIG. 8 depicts a computer system that can be utilized in various embodiments of the present invention to implement the computer and/or the display, according to one or more embodiments of the invention.

FIG. 8 depicts a computer system that can be used to implement the methods of FIG. 2, FIG. 3, and FIG. 4, in various embodiments of the present invention. Various embodiments of method and system for uniform, consistent, stateless, and deterministic consistent hashing for fixed size partitions, as described herein, may be executed on one or more computer systems, which may interact with various other devices. One such computer system is computer system 800 illustrated by FIG. 8, which may in various embodiments implement any of the elements or functionality illustrated in FIGS. 1-7. In various embodiments, computer system 800 may be configured to implement methods described above. The computer system 800 may be used to implement any other system, device, element, functionality or method of the above-described embodiments. In the illustrated embodiments, computer system 800 may be configured to implement methods 200 through 400, as processor-executable executable program instructions 822 (e.g., program instructions executable by processor(s) 810) in various embodiments.

In the illustrated embodiment, computer system 800 includes one or more processors 810 coupled to a system memory 820 via an input/output (I/O) interface 830. Computer system 800 further includes a network interface 840 coupled to I/O interface 830, and one or more input/output devices 850, such as cursor control device 860, keyboard 870, and display(s) 880. In various embodiments, any of components may be utilized by the system to receive user input described above. In various embodiments, a user interface (e.g., user interface) may be generated and displayed on display 880. In some cases, it is contemplated that embodiments may be implemented using a single instance of computer system 800, while in other embodiments multiple such systems, or multiple nodes making up computer system 800, may be configured to host different portions or instances of various embodiments. For example, in one embodiment some elements may be implemented via one or more nodes of computer system 800 that are distinct from those nodes implementing other elements. In another example, multiple nodes may implement computer system 800 in a distributed manner.

In different embodiments, computer system 800 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 800 may be a uniprocessor system including one processor 810, or a multiprocessor system including several processors 810 (e.g., two, four, eight, or another suitable number). Processors 810 may be any suitable processor capable of executing instructions. For example, in various embodiments processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

System memory 820 may be configured to store program instructions 822 and/or data 832 accessible by processor 810. In various embodiments, system memory 820 may be implemented using any suitable memory technology, such as static random access memory (SRAM), synchronous dynamic RAM (SDRAM), nonvolatile/Flash-type memory, persistent storage (magnetic or solid state), or any other type of memory. In the illustrated embodiment, program instructions and data implementing any of the elements of the embodiments described above may be stored within system memory 820. In other embodiments, program instructions and/or data may be received, sent or stored upon different types of computer-accessible media or on similar media separate from system memory 820 or computer system 800.

In one embodiment, I/O interface 830 may be configured to coordinate I/O traffic between processor 810, system memory 820, and any peripheral devices in the system, including network interface 840 or other peripheral interfaces, such as input/output devices 850, In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices attached to a network (e.g., network 890), such as one or more external systems or between nodes of computer system 800. In various embodiments, network 890 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 840 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 850 may, in some embodiments, include one or more display terminals, keyboards, keypads, touch pads, scanning devices, voice or optical recognition devices, or any other devices suitable for entering or accessing data by one or more computer systems 800. Multiple input/output devices 850 may be present in computer system 800 or may be distributed on various nodes of computer system 800. In some embodiments, similar input/output devices may be separate from computer system 800 and may interact with one or more nodes of computer system 800 through a wired or wireless connection, such as over network interface 840.

In some embodiments, the illustrated computer system may implement any of the methods described above, such as the methods illustrated by the flowcharts of FIG. 2, FIG. 3, and FIG. 4. In other embodiments, different elements and data may be included.

Those skilled in the art will appreciate that computer system 800 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 800 may be transmitted to computer system 800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method for uniform, consistent, stateless, and deterministic consistent hashing for fixed size partitions, comprising:
   receiving server information for a plurality of servers in a server pool;
   ordering the server information for the plurality of servers into an order of ordered server information;
   calculating a mean number of partitions per server in the server pool;
   calculating a first maximum allowed number of partitions for a server by applying a floor function to the calculated mean number of partitions per server in the server pool, wherein the first maximum allowed number of partitions is the nearest whole number below the mean number of partitions per server in the server pool;
   in the order of the ordered server information, assigning partitions to the servers using the first maximum allowed number of partitions per server, based on a hashing function;
   calculating a second maximum allowed number of partitions fora server by applying a ceiling function to the calculated mean number of partitions per server in the server pool, wherein the second maximum allowed number of partitions is the nearest whole number above the mean number of partitions per server in the server pool;

in the order of the ordered server information, assigning partitions to the servers using the second maximum allowed number of partitions per server, based on the hashing function; and assigning unassigned partitions wherein assigning comprises:

for each unassigned partition, in the order of the ordered server information, mapping the partition to the server with the least number of assigned partitions of all the servers in the server pool at a time of the mapping;

wherein assigning partitions to servers using the first maximum allowed number of partitions comprises:

for each server in the plurality of servers:

for each of a plurality of virtual point indexes for each server:

determining whether the server has less than the first maximum allowed number of partitions;

computing a virtual point on a consistent hashing ring when it is determined that the server has less than the first maximum allowed number of partitions, wherein the virtual point defines a location within a partition on the consistent hashing ring;

determining whether the virtual point is located in a partition of the consistent hashing ring that is already assigned to one of the servers in the server pool; and mapping the partition to the server that is associated with the virtual point index if it is determined that the partition of the consistent hashing ring has not been previously mapped to another server from the server pool; and wherein assigning partitions to servers using the second maximum allowed number of partitions comprises:

for each server in the plurality of servers: for each of a plurality of virtual point indexes for each server:

determining whether the server has less than the second maximum allowed number of partitions;

computing a virtual point on a consistent hashing ring, when it is determined that the server has less than the second maximum allowed number of partitions, wherein the virtual point defines a location within a partition on the consistent hashing ring;

determining whether the virtual point is located in a partition of the consistent hashing ring that is already assigned to one of the servers in the server pool; and mapping the partition to the server that is associated with the virtual point index if it is determined that the partition of the consistent hashing ring has not been previously mapped to another server from the server pool.

2. The method of claim 1, wherein each server is associated with a configurable number of virtual point indexes.

3. The method of claim 2, wherein the virtual point is calculated by performing the hashing function on any one of the server names appended to a virtual point index from the servers contained in the server pool.

4. The method of claim 1, wherein each calculated virtual point is associated with a location on a consistent hashing ring, and wherein the consistent hashing ring is comprised of a subset of subsequent hashing function outputs.

5. The method of claim 4, wherein the location on the consistent hashing ring is associated with one of the partitions.

6. The method of claim 1, wherein the partitions are on a consistent hashing ring divided into fixed size partitions, and wherein the consistent hashing ring is comprised of a subset of subsequent hashing function outputs.

7. The method of claim 1, wherein one of the partitions is mapped to one of the servers from the server pool.

8. A non-transitory computer readable medium for storing computer instructions that, when executed by at least one processor causes the at least one processor to perform a method for uniform, consistent, stateless, and deterministic consistent hashing for fixed size partitions, comprising:

receiving server information for a plurality of servers in a server pool;

ordering the server information for the plurality of servers into an order of ordered server information; calculating a mean number of partitions per server in the server pool;

calculating a first maximum allowed number of partitions for a server by applying a floor function to the calculated mean number of partitions per server in the server pool, wherein the first maximum allowed number of partitions is the nearest whole number below the mean number of partitions per server in the server pool;

in the order of the ordered server information, assigning partitions to the servers using the first maximum allowed number of partitions per server, based on a hashing function;

calculating a second maximum allowed number of partitions fora server by applying a ceiling function to the calculated mean number of partitions per server in the server pool, wherein the second maximum allowed number of partitions is the nearest whole number above the mean number of partitions per server in the server pool;

in the order of the ordered server information, assigning partitions to the servers using the second maximum allowed number of partitions per server, based on the hashing function; and assigning unassigned partitions wherein assigning comprises:

for each unassigned partition, in the order of the ordered server information, mapping the partition to the server with the least number of assigned partitions of all the servers in the server pool at a time of the mapping;

wherein assigning partitions to servers using the first maximum allowed number of partitions comprises:

for each server in the plurality of servers:

for each of a plurality of virtual point indexes for each server:

determining whether the server has less than the first maximum allowed number of partitions;

computing a virtual point on a consistent hashing ring when it is determined that the server has less than the first maximum allowed number of partitions, wherein the virtual point defines a location within a partition on the consistent hashing ring;

determining whether the virtual point is located in a partition of the consistent hashing ring that is already assigned to one of the servers in the server pool; and mapping the partition to the server that is associated with the virtual point index when it is determined that the partition of the consistent hashing ring has not been previously mapped to another server from the server pool; and wherein assigning partitions to servers using the second maximum allowed number of partitions comprises:

for each server in the plurality of servers:

for each of a plurality of virtual point indexes for each server:

determining whether the server has less than the second maximum allowed number of partitions; computing a virtual point on a consistent hashing ring, when it is determined that the server has less than the second maximum allowed number of partitions, wherein the virtual point defines a location within a partition on the consistent hashing ring;

determining whether the virtual point is located in a partition of the consistent hashing ring that is already assigned to a one of the servers in the server pool; and mapping the partition to the server that is associated with the virtual point index if it is determined that the partition of the consistent hashing ring has not been previously mapped to another server from the server pool.

9. The non-transitory computer readable medium of claim 8, wherein each server is associated with a configurable number of virtual point indexes.

10. The non-transitory computer readable medium of claim 9, wherein the virtual point is calculated by performing the hashing function on any one of the server names appended to a virtual point index from the servers contained in the server pool.

11. The non-transitory computer readable medium of claim 8, wherein each calculated virtual point is associated with a location on a consistent hashing ring, and wherein the consistent hashing ring is comprised of a subset of subsequent hashing function outputs.

12. The non-transitory computer readable medium of claim 11, wherein the location on the consistent hashing ring is associated with one of the partitions.

13. The non-transitory computer readable medium of claim 8, wherein the consistent hashing ring is divided into fixed size partitions, and wherein the consistent hashing ring is comprised of a subset of subsequent hashing function outputs.

14. The non-transitory computer readable medium of claim 8, wherein one of the partitions is mapped to one of the servers from the server pool.

15. A system for uniform, consistent, stateless, and deterministic consistent hashing for fixed size partitions, comprising:
   a. at least one processor;
   b. at least one input device;
   c. a plurality of servers in a server pool; and
   d. at least one storage device storing processor-executable instructions which, when executed by the at least one processor, perform a method including:

receiving server information for the plurality of servers in a server pool;

ordering the server information for the plurality of servers into an order of ordered server information;

calculating a mean number of partitions per server in the server pool;

calculating a first maximum allowed number of partitions for a server by applying a floor function to the calculated mean number of partitions per server in the server pool, wherein the first maximum allowed number of partitions is the nearest whole number below the mean number of partitions per server in the server pool;

in the order of the ordered server information, assigning partitions to the servers using the first maximum allowed number of partitions per server, based on a hashing function;

calculating a second maximum allowed number of partitions fora server by applying a ceiling function to the calculated mean number of partitions per server in the server pool, wherein the second maximum allowed number of partitions is the nearest whole number above the mean number of partitions per server in the server pool;

in the order of the ordered server information, assigning partitions to the servers using the second maximum allowed number of partitions per server, based on the hashing function; and assigning unassigned partitions wherein assigning comprises:

for each unassigned partition, in the order of the ordered server information, mapping the partition to the server with the least number of assigned partitions of all the servers in the server pool at a time of the mapping;

wherein assigning partitions to servers using the first maximum allowed number of partitions comprises:

for each server in the plurality of servers:

for each of a plurality of virtual point indexes for each server:

determining whether the server has less than the first maximum allowed number of partitions;

computing a virtual point on a consistent hashing ring when it is determined that the server has less than the first maximum allowed number of partitions, wherein the virtual point defines a location within a partition on the consistent hashing ring;

determining whether the virtual point is located in a partition of the consistent hashing ring is already assigned to a server;

mapping the partition to the server when it is determined that the partition of the consistent hashing ring is not assigned to a server, and wherein assigning partitions to servers using the second maximum allowed number of partitions comprises:

for each server in the plurality of servers:

for each of a plurality of virtual point indexes for each server:

determining whether the server has less than the second maximum allowed number of partitions;

computing a virtual point on a consistent hashing ring, when it is determined that the server has less than the second maximum allowed number of partitions, wherein the virtual point defines a location within a partition on the consistent hashing ring;

determining whether the virtual point is located in a partition of the consistent hashing ring is already assigned to a server; and mapping the partition to the server when it is determined that the partition of the consistent hashing ring is not assigned to a server.

\* \* \* \* \*